United States Patent
Kidouchim

(10) Patent No.: US 6,939,003 B2
(45) Date of Patent: Sep. 6, 2005

(54) MULTI-FACETED DETACHABLE MAGNETIC HINGE SYSTEM

(76) Inventor: Armand Kidouchim, 5953 El Escorpion Rd., Woodland Hills, CA (US) 91367

( * ) Notice: Subject to any disclaimer, the term of this patent is extended or adjusted under 35 U.S.C. 154(b) by 39 days.

(21) Appl. No.: 10/836,748

(22) Filed: Apr. 29, 2004

(65) Prior Publication Data

US 2005/0052613 A1 Mar. 10, 2005

Related U.S. Application Data

(63) Continuation-in-part of application No. 10/659,227, filed on Sep. 9, 2003, now Pat. No. 6,869,180.

(51) Int. Cl.7 .................................................. G02C 9/00
(52) U.S. Cl. ............................. 351/47; 351/57; 16/228
(58) Field of Search .............................. 351/47, 57, 44, 351/41, 48, 58, 158; 16/228

(56) References Cited

U.S. PATENT DOCUMENTS

| 5,335,025 | A | | 8/1994 | Wang |
|---|---|---|---|---|
| 6,089,708 | A | | 7/2000 | Ku |
| 6,352,342 | B1 | | 3/2002 | Huang |
| 6,354,703 | B1 | | 3/2002 | Sadler |
| 6,488,372 | B1 | * | 12/2002 | Park .......................... 351/47 |
| 6,533,411 | B1 | | 3/2003 | Chen et al. |
| 2002/0140897 | A1 | | 10/2002 | Huang |
| 2003/0112408 | A1 | | 6/2003 | Zelman |

FOREIGN PATENT DOCUMENTS

WO  WO 90/09611  8/1990

* cited by examiner

*Primary Examiner*—Hung Xuan Dang
(74) *Attorney, Agent, or Firm*—Kelly Lowry & Kelley, LLP

(57) ABSTRACT

A detachable magnetic hinge system for rotatably coupling objects, such as primary eyewear and auxiliary eyewear includes first and second hinge members which are magnetically coupled to one another. The first hinge member is associated with the first object and has at least six generally planar outwardly-facing facets. The second hinge member is associated with the second object and has a plurality of generally planar inwardly-facing facets configured to detachably overlie less than all of the outwardly-facing facets of the first hinge member. Due to the magnetic coupling, selective segmented rotation of the second hinge member relative to the first hinge member is provided.

27 Claims, 11 Drawing Sheets

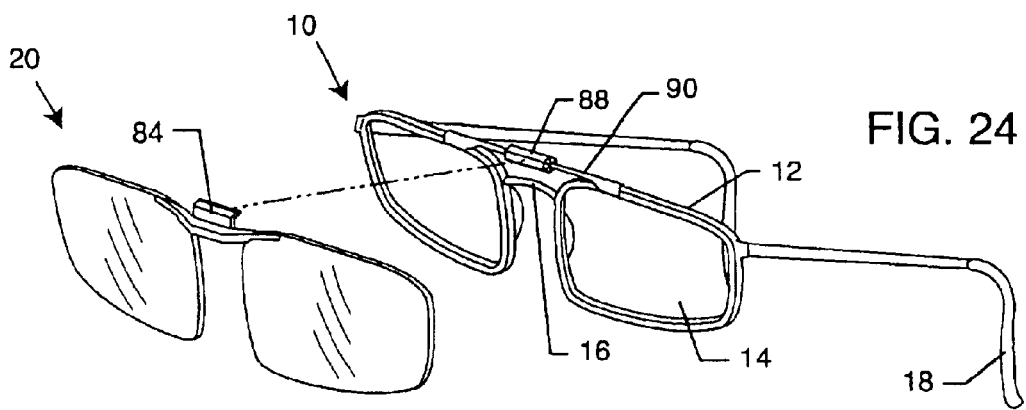
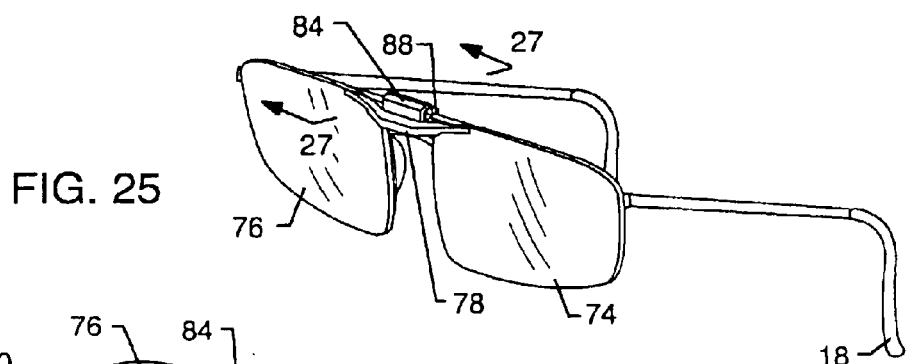
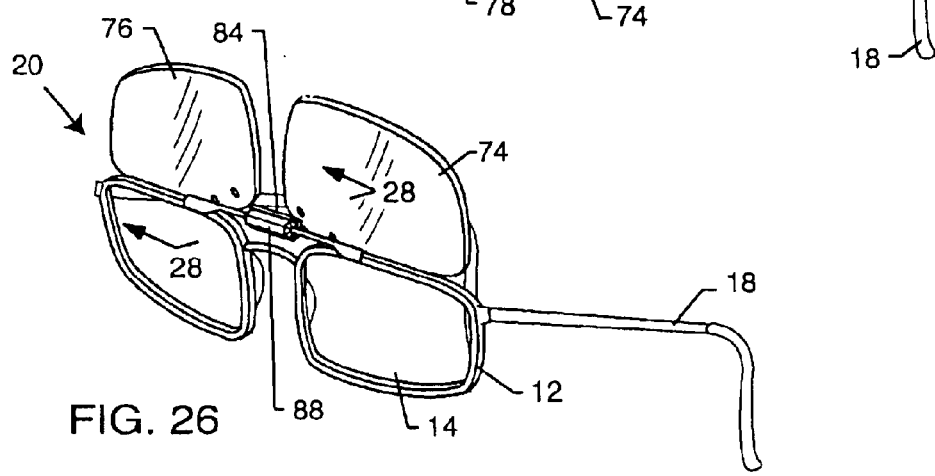
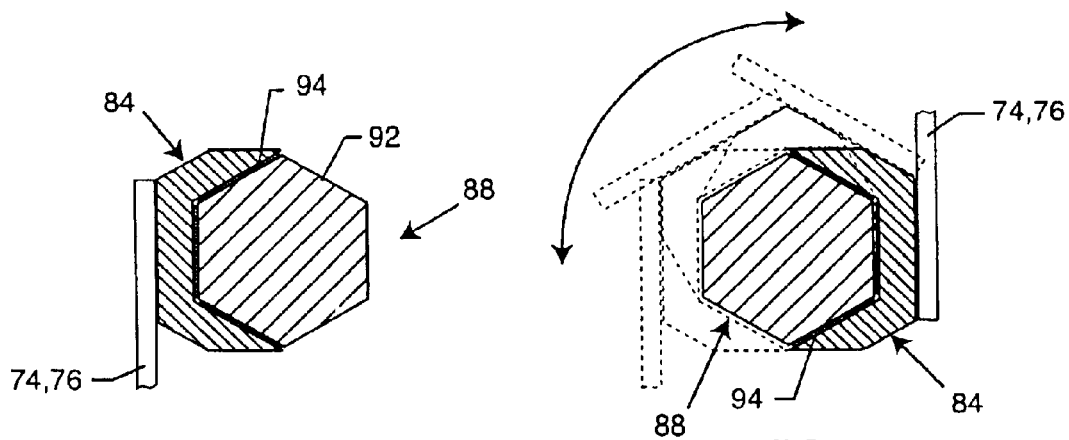
FIG. 24
FIG. 25
FIG. 26
FIG. 27
FIG. 28

MULTI-FACETED DETACHABLE MAGNETIC HINGE SYSTEM

RELATED APPLICATION

This is a continuation-in-part application of U.S. patent application Ser. No. 10/659,227, filed Sep. 9, 2003 U.S. Pat. No. 6,869,190.

BACKGROUND OF THE INVENTION

The present invention generally relates to eyeglass devices. More particularly, the present invention relates to a magnetic hinge system which is particularly adapted to mount auxiliary eyeglasses or other eyewear, such as sunglass lenses, onto primary eyeglasses.

People often wear eyeglasses to correct their vision, be it near-sighted or far-sighted. The eyeglasses have a main frame with lenses fitted thereto. Protective-lens eyeglasses are also available of generally the same construction.

There are instances, such as when in the sun, when an auxiliary eyewear, such as sunglasses, is desirable. There exist clip-on sun shades which are clipped to the rim or frame of the primary eyeglasses. However, most such sun shades are typically not able to be pivoted upwardly and out of view, such as when entering a building or the like from outdoors. Instead, the sun shades must be completely removed and stored in a pocket or the like of the eyeglass wearer.

Advancements in the field have led to the use of magnetic members which are used to removably attach the sun shade or auxiliary lenses to the eyeglasses. However, the magnetic connections are typically not pivotally arranged so as to enable the user to "flip-up" the sun shades away from the eyeglass lenses.

Yet other prior art auxiliary eyewear require specially manufactured eyeglasses for a stable connection. Alternatively, the auxiliary eye shades must be semi-permanently attached to the eyeglasses, such as using screws or the like. Of course, this does not enable the eyeglass wearer to conveniently remove the sun shades or auxiliary lenses.

In addition to the shortcomings described above, prior art auxiliary eyewear in general has the shortcoming that they are not adapted to be connected to any piece of eyewear. That is, the prior art auxiliary eyewear does not have universal connection means. Instead, they rely upon clips or attachments to the eyeglass to the primary eyeglasses which are usually very specific in nature. If not completely specific, the auxiliary eyewear still suffers a drawback of connecting to the primary eyewear in such a manner so as to limit it to only several styles of eyewear. This is due to the differences between the "nose bridge" portion of the frames and the size of the frames of the primary eyewear which varies dramatically between different styles.

In addition to removably and rotatably associating auxiliary eyewear with primary eyewear, there are other instances where a detachable connection between objects is desirable. In particular, there are instances where both a detachable and rotatable connection is preferred or even necessary.

Accordingly, there is a continuing need for a hinge system which detachably connects two objects and permits the objects to be at least partially rotated with respect to one another. There is also a continuing need for auxiliary lenses or eye shades which can be easily detached and connected to a pair of pre-existing eyeglasses. Such auxiliary eyewear should be capable of being detatchably connected to virtually any primary eyewear so as to be universal in nature. Preferably, such auxiliary lenses should be capable of being pivoted out of alignment with the lenses of the regular eyeglasses. The present invention fulfills these needs and provides other related advantages.

SUMMARY OF THE INVENTION

The present invention resides in a magnetic hinge system for detachably and rotatably coupling first and second objects. The system generally comprises a first hinge member associated with the first object and defining a hinge axis, the first hinge member having at least six generally planar outwardly-facing facets disposed about the hinge axis.

A second hinge member is associated with the second object and has a plurality of generally planar inwardly-facing facets configured to overlie less than all of the outwardly-facing facets of the first hinge member. Preferably, the second hinge member includes at least half as many facets as the first hinge member so as to overlie approximately 180° of the exterior surface of the first hinge member. In a particularly preferred embodiment, the first hinge member comprises a hexagon, and the second hinge member includes three facets overlying three outwardly-facing facets of the hexagon at any given time.

A magnetic field is associated with at least some of the facets to couple the second hinge member to the first hinge member and permit selective segmented rotation of the second hinge member relative to the first hinge member about the hinge axis. In one embodiment, the first hinge member is magnetic. At least a plurality of the facets of the first hinge member may have magnets embedded therein for magnetic coupling with the facets of the second hinge member. In another embodiment, the second hinge member is magnetic. At least a plurality of the facets of the second hinge member may have magnets embedded therein for magnetic coupling with the facets of the first hinge member. Alternatively, at least a plurality of the facets of both the first and second hinge members have magnets embedded therein such that the magnets of the first and second hinge members couple with one another as the facets thereof are placed into contact with one another. In a particularly preferred embodiment, the facets of the second hinge member have magnets associated with them and magnetically attract the metal facets of the first hinge.

The magnetic hinge system of the present invention is particularly adapted for use in a universal eyewear attachment system. In this embodiment, the first object comprises a cross-bar having saddles configured to be frictionally attached to a primary eyewear. Typically, gripping material is disposed on an inner surface of the saddles for frictionally engaging a frame of the primary eyewear. The second object comprises an auxiliary eyewear, such as sun shades, a magnifying lens, etc. The coupling of the first and second hinge members enable the auxiliary eyewear to be detachably connected to the primary eyewear and rotated into and out of the field of view of the primary eyewear lens.

In yet another embodiment, the cross-bar includes an extension which supports a plurality of first hinges spaced apart from one another. A plurality of eyewear can be pivotally mounted to the primary eyewear by mounting the respective second hinge of each auxiliary eyewear onto one of the first hinges on the extension.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 24 is a partially exploded front perspective view of the auxiliary eyewear of FIG. 23, and a primary eyewear having a hinge member associated therewith;

FIG. 25 is a front perspective view of the auxiliary eyewear magnetically coupled to the primary eyewear by means of the hinge members;

FIG. 26 is a front perspective view, illustrating the auxiliary eyewear pivoted upwardly and in a non-use position;

FIG. 27 is a cross-sectional view taken generally along line 27—27 of FIG. 25, illustrating the magnetic coupling of first and second hinge members, in accordance with the present invention;

FIG. 28 is a cross-sectional view taken generally along line 28—28 of FIG. 26, illustrating the segmented movement of the auxiliary eyewear from a use position to a non-use position;

DETAILED DESCRIPTION OF THE PREFERRED EMBODIMENTS

As illustrated in FIGS. 1–21 for purposes of illustration, the present invention, in various embodiments, resides in a universal eyeglass attachment for attaching an auxiliary eyewear or lens to a frame of primary eyeglasses.

Figure 1:
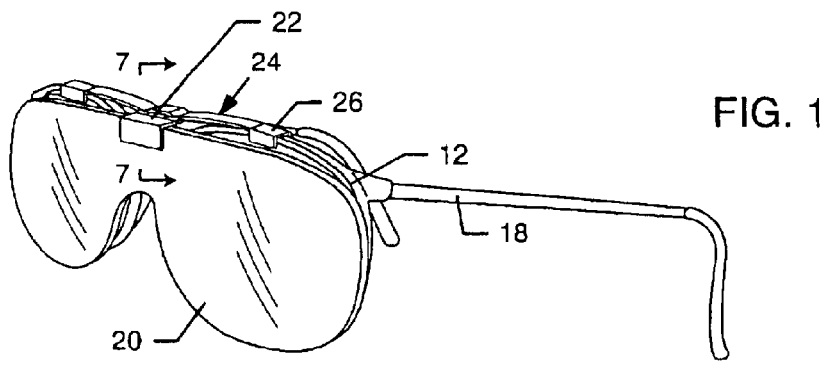
FIG. 1 is a front perspective view of an auxiliary lens disposed over lenses of regular eyeglasses, in accordance with the present invention.
Figure 2:
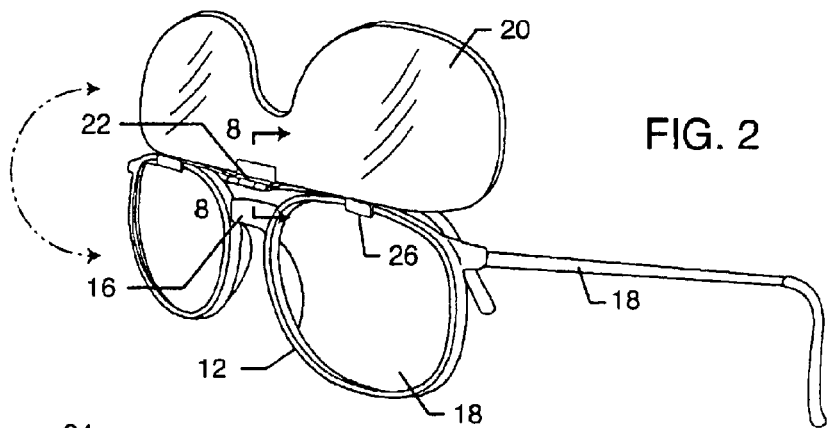
FIG. 2 is a front perspective view similar to FIG. 1, illustrating the auxiliary eyewear pivoted upwardly and away from the lenses of the regular eyeglasses.

With reference to FIGS. 1 and 2, a universal eyeglass attachment embodying the present invention is illustrated attached to a pair of primary eyewear 10, typically eyeglasses having a frame 12 which supports one or more lenses 14, and which includes a nose bridge portion 16, and elongated ear attachments 18. The universal eyeglass attachment includes an auxiliary lens 20, having a clip 22 which is removably mounted to a docking head 24 attached to the frame 12 of the eyeglasses 10. Although the auxiliary lense 20 is illustrated as a single lens, such as a sun shield, it should be understood that the auxiliary lense 20 can be of different configurations and uses. For example, the auxiliary lense 20 can comprise a protective shield or eyewear. The auxiliary lense 20 can also comprise one or more lenses within a frame, similar to the primary eyewear 10. The selection of the auxiliary lense 20 will depend upon the need of the user.

As illustrated in FIGS. 1 and 2, preferably the clip 22 is pivotally attached to the auxiliary eyewear 20 such that the eyewear or lense 20 can be moved between an in-use position wherein the lense 20 is generally aligned with the one or more lenses 14 of the primary eyewear 10, or pivoted upwardly so as to be out of alignment with the lenses 14 of the primary eyewear 10 and in a non-use position.

Figure 3:
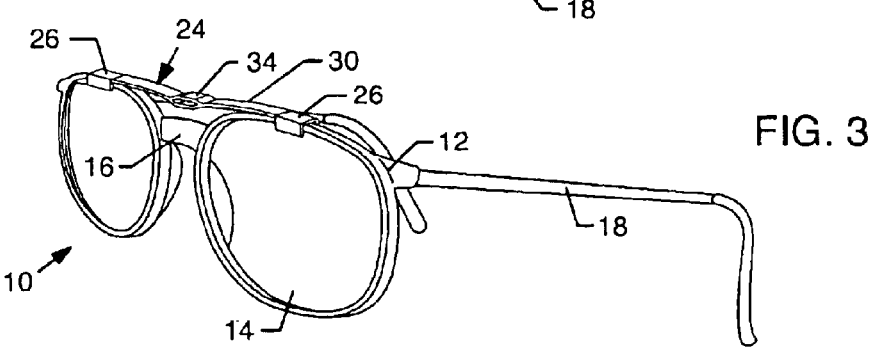
FIG. 3 is a front perspective view illustrating a docking head attached to the frame of the regular eyeglasses in accordance with the present invention.
Figure 4:
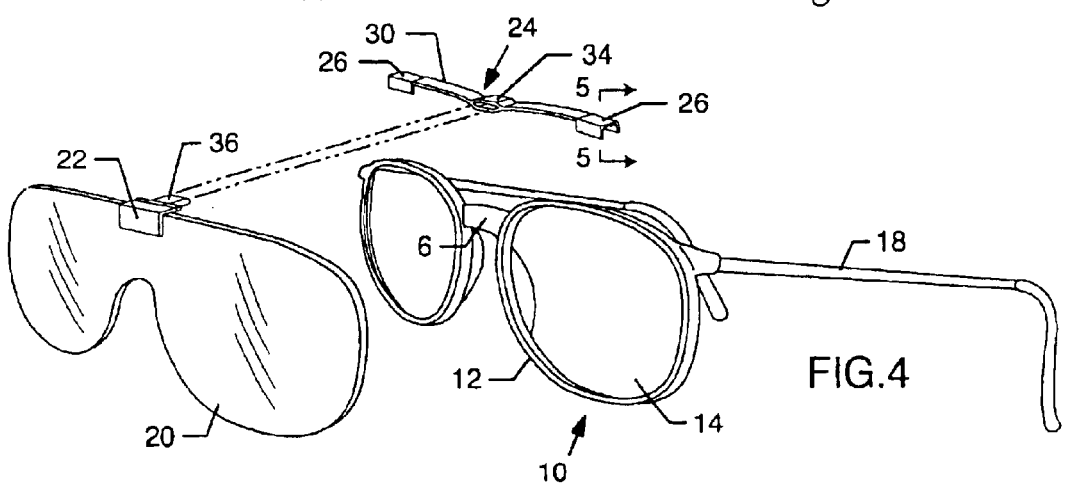
FIG. 4 is a partially exploded perspective view of the primary eyeglasses, docking head, and a clip pivotally attached to an auxiliary eyewear which is connectable to the docking head.
Figure 5:
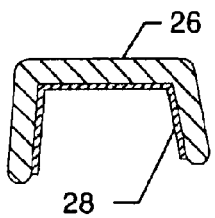
FIG. 5 is a cross-sectional view taken generally along line 5—5 of FIG. 4, illustrating a preferred configuration of a saddle of the docking head used to removably attach it to the primary eyeglass frame.
Figure 9:
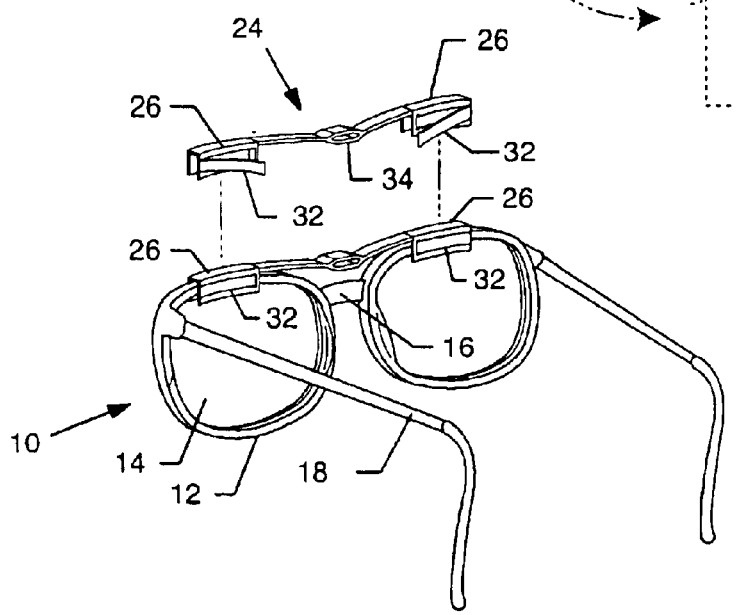
FIG. 9 is a partially exploded and rear perspective view of a primary eyewear having a docking head embodying the present invention with swing arms to lock the docking head thereon.

With reference now to FIGS. 3–5, the docking head 24 includes a pair of saddles 26 which are configured to be removably attached to the frame 12 of the primary eyewear, in particular, the saddles 26 are configured to be attached to an upper portion of the frame 12 which encircles the lenses 14. As shown in FIG. 5, preferably the saddles 26 are of a U-shaped configuration having a cushion grip material 28 lining the inner-surface thereof to protect the frame 12 of the eyewear 10 from being damaged as well as providing a compressible material to accommodate frames 12 of different thicknesses. As shown in FIG. 9, the saddles 26 may include swing-arms 32 which can be used to accommodate frames 12 of different thicknesses and serve to tighten and lock the saddles 26 onto the eyeglass frame 12. The swing-arms 32 are unlatched when the saddles 26 are placed onto the primary eyewear 10 and then pivoted closed against the frame 12 to securely lock the docking head 24 in place. The reverse steps are taken to remove the docking head 24.

Typically, the saddles 26 are interconnected with a cross-beam 30. This cross-beam 30 includes means for removably attaching the clip 22. Such means in the embodiment illustrated in FIGS. 1–9 comprises a slot 34 formed in the cross-beam and which is configured to receive a tongue 36 extending from clip 32.

Figure 6:
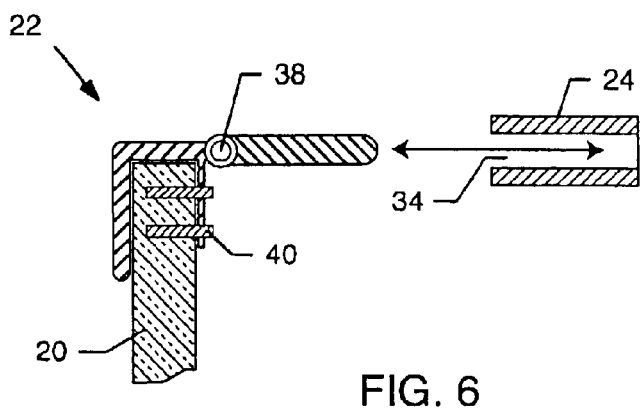
FIG. 6 is a cross-sectional view illustrating a tongue of the clip insertable into a slot of the docking head in accordance with the present invention.
Figure 7:
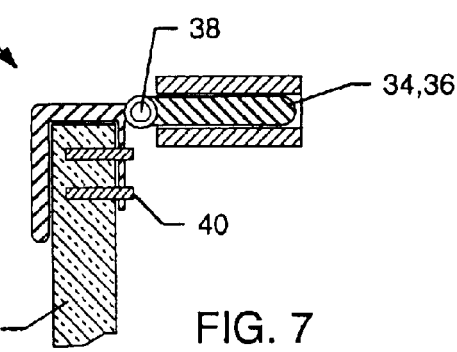
FIG. 7 is a cross-sectional view taken generally along line 7—7 of FIG. 1, illustrating the auxiliary eyewear attached to the docking head and in an in-use position.
Figure 8:
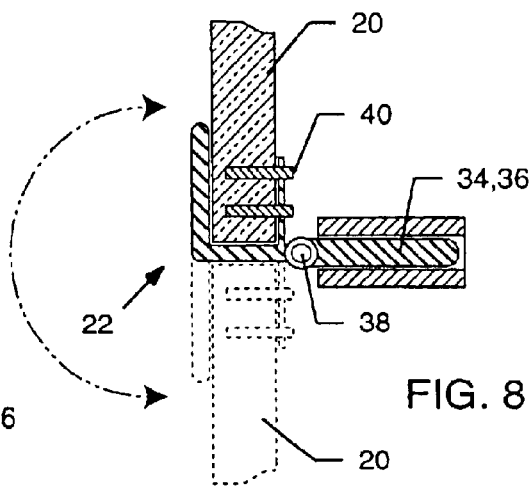
FIG. 8 is a cross-section view taken generally along line 8—8 of FIG. 2, illustrating the auxiliary eyewear being pivoted upwardly and away from the lenses of the primary eyewear.

With reference now to FIGS. 6–8, cross-sectional views are shown illustrating the frictional engagement of the tongue 36 of clip 32 with the slot 34 of docking head 24. The docking head 24 may include catches, releasable catches or the like so as to lock the tongue 36 therein, although not illustrated. The important aspect is that the clip 22 can be removably attached to the docking head 24, thus removably attaching the auxiliary eyewear 20 to the primary eyewear 10. As illustrated, the clip 22 includes a hinged portion 38 to allow pivotal movement between the tongue 36 and the portion of the clip 22 attached to the auxiliary lense for eyewear 20. Clip 22 can be attached to auxiliary eyewear 20 by any known means, including the illustrated pins 40, or by adhesive, welding or otherwise. The incorporation of hinge 38 enables the auxiliary eyewear lense to be pivotally in front of the lenses 14 of the primary eyewear 10, and away from the lenses 14, as illustrated and described above.

Figure 10:
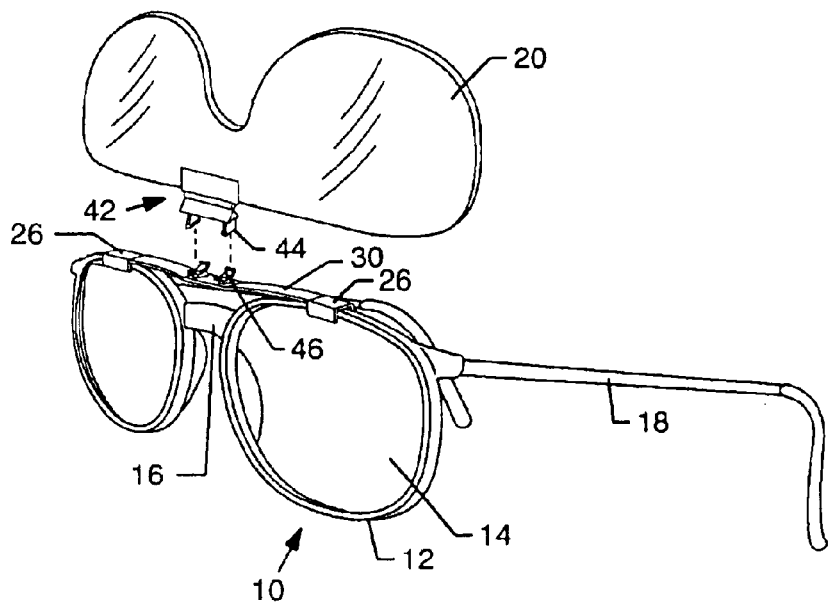
FIG. 10 is a partially exploded perspective view of yet another attachment mechanism used to removably connect auxiliary eyewear and primary eyewear in accordance with the present invention.
Figure 11:
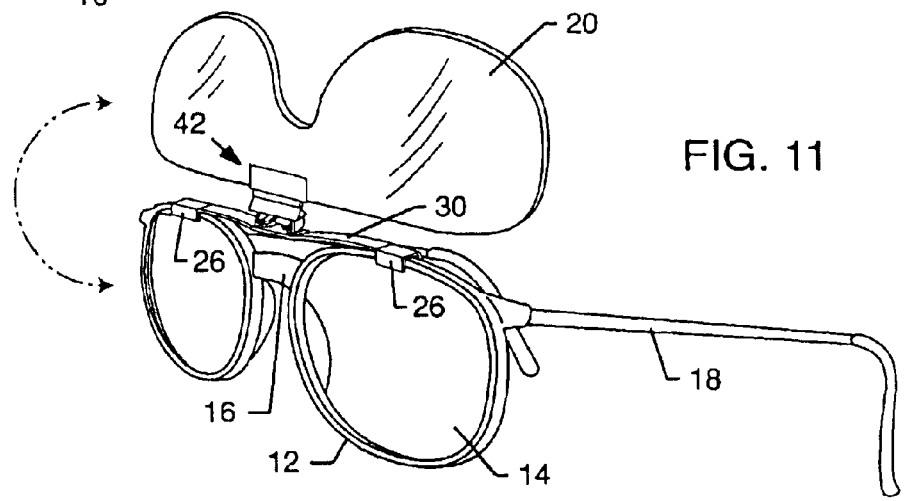
FIG. 11 is a front perspective view illustrating the auxiliary eyewear attached to the primary eyewear and moved into a non-use position.
Figure 12:
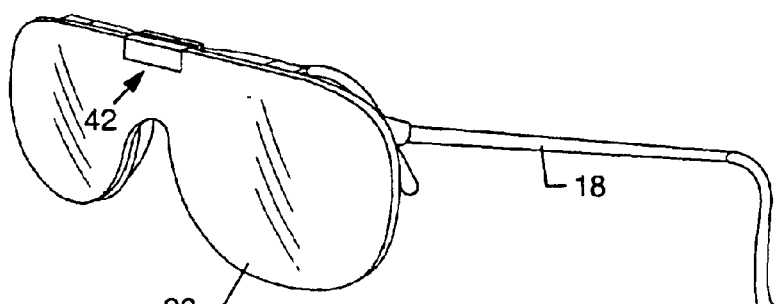
FIG. 12 is a front perspective view illustrating the auxiliary eyewear pivoted downwardly into an in-use position.
Figure 13:
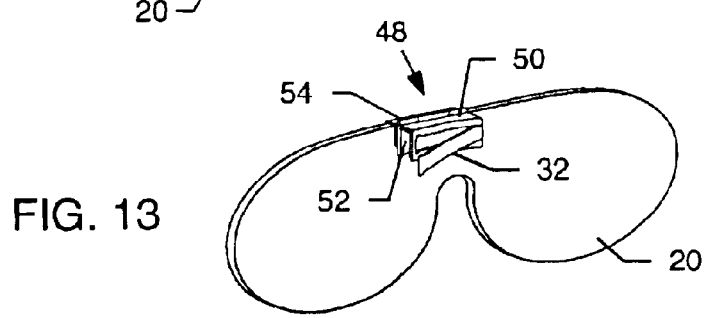
FIG. 13 is a rear perspective view of an auxiliary eyewear having a clip embodying the present invention with a swing-arm.

With reference now to FIGS. 10–12, another embodiment of the present invention is illustrated wherein clip 42, which is also pivotally attached to auxiliary eyewear 20 includes protrusion 44 which frictionally engage with protrusion 46 of the docking head 24. Such protrusion 44 or 46 may form a snap-fit connection or the like. Once engaged, the auxiliary lense can be pivotally moved as described above and illustrated in FIGS. 11 and 12. Thus, it will be appreciated by those skilled in the art that different mechanisms and design may be implemented for removably attaching the auxiliary eyewear and primary eyewear 10 using a clip and docking head in accordance with a broad concept illustrated and described above.

With reference now to FIGS. 13–16, yet another embodiment of the present invention is illustrated. The auxiliary lense or eyewear 20 has a clip 48 attached thereto which includes a portion fixed to the auxiliary eyewear 20 and a body 50 defining any open-ended elongated slot 52 which is pivotally attached to the clip 48 with hinge 54. As will be more fully described herein, the body 50 may include a swing-arm 32 for locking the body 50 to a docking head 56.

Figure 14:
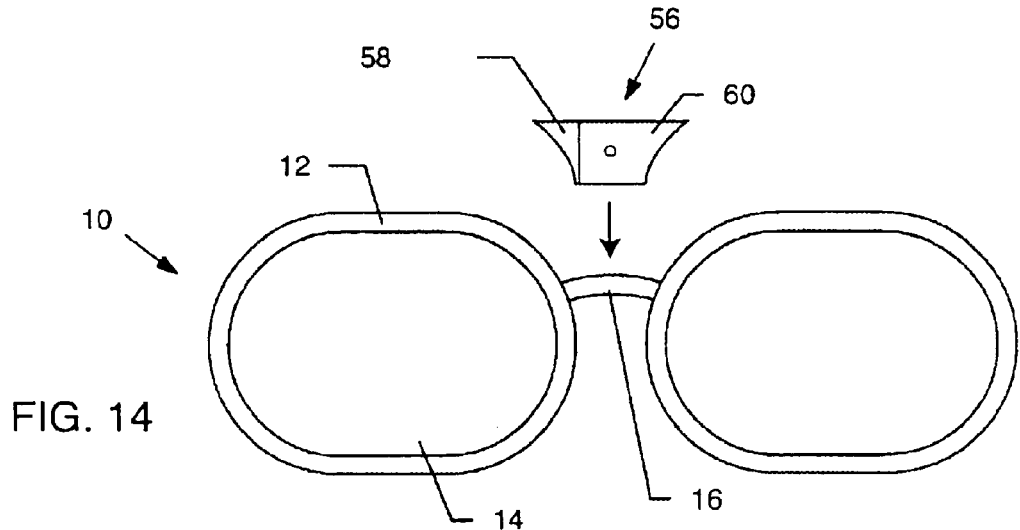
FIG. 14 is a front view of a primary eyewear with a docking head embodying the present invention being inserted thereon.
Figure 15:
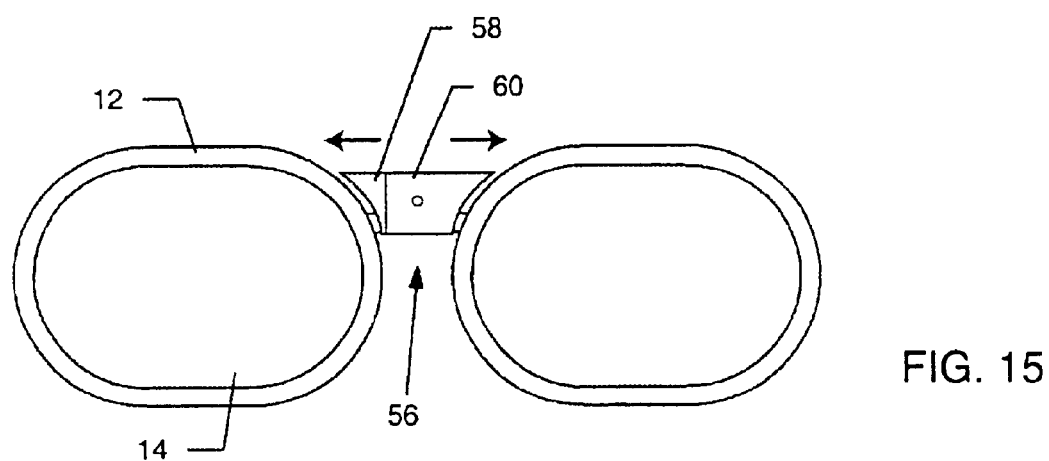
FIG. 15 is a front view similar to FIG. 14, illustrating the docking head expanding over a nose bridge portion of the frame of the primary eyewear.
Figure 16:
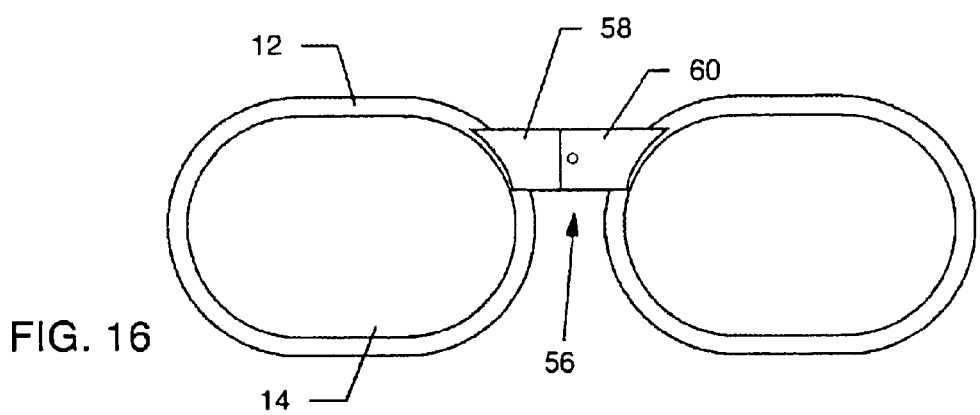
FIG. 16 is a front elevational view similar to FIG. 15, with the docking head completely expanded and ready for attachment to the clip of the auxiliary eyewear of FIG. 13.
Figure 17:
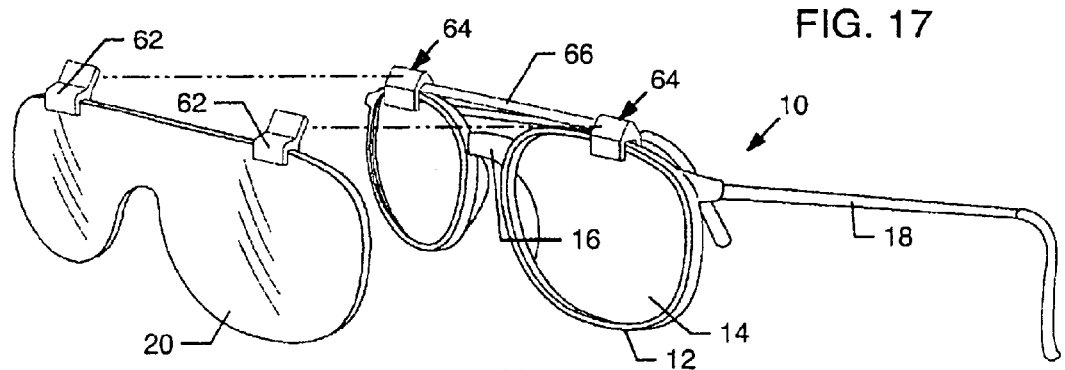
FIG. 17 is a partially exploded perspective view of yet another eyeglass attachment embodying the present invention.
Figure 18:
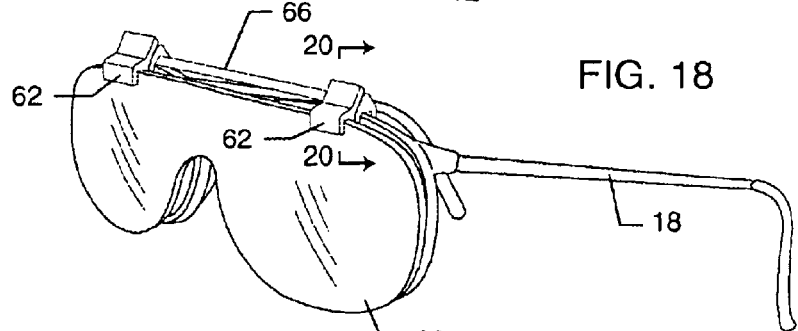
FIG. 18 is a front perspective view similar to FIG. 17, with the auxiliary eyewear attached to the primary eyewear in an in-use position.
Figure 19:
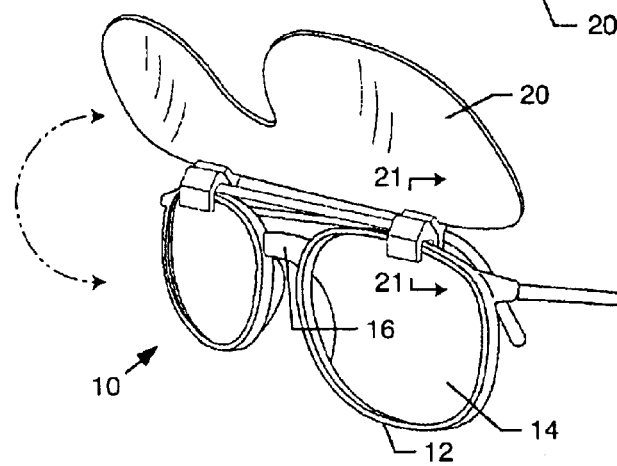
FIG. 19 is a front perspective view similar to FIG. 18, with the auxiliary eyewear pivoted away from the lenses of the primary eyewear.

With particular reference now to FIGS. 14–16, the docking head 56 is comprised of two members 58 and 60 which are slidably interconnected with one another. These slidable members 58 and 60 include an open-face recess or slot for receiving the nose bridge 16 portion of the primary eyewear frame 12. Members 58 and 60 are biased outwardly, or in an expanded position, such that when compressed and placed on the nose bridge portion 16, they naturally expand outward and towards the lens-supporting portion of frame 12. Such biasing means can comprise a compression spring associated with the slidable members 58 and 60. Once the docking head 56 is secured to the nose bridge portion 16, the body 50 is attached thereto by inserting slot 52 over the docking head 56. The swing-arm 32 may then be used to secure the clip 48, and auxiliary eyewear 20, to the docking head 56. The auxiliary eyewear 20 can then be pivoted upward and downward, as described above.

With reference now to FIGS. 17–21, yet another embodiment of the present invention is illustrated wherein couplings 62 attached to the auxiliary eyewear 20 are magnetically attached to the saddles 64. To ensure proper spacing, a cross-bar 66 typically interconnects the saddles 64. The saddles 64 include a front facet 68 and a rear facet 70. Each facet includes angularly offset faces having a magnet 72 imbedded therein or otherwise having magnetic properties. The coupling 62 is configured to essentially mate with the angled faces. Preferably, the coupling 62 also include a pair of magnets 72 which are magnetically attracted to the magnets 72 of the front and rear facets 68 and 70 of the saddles 64.

Figure 20:
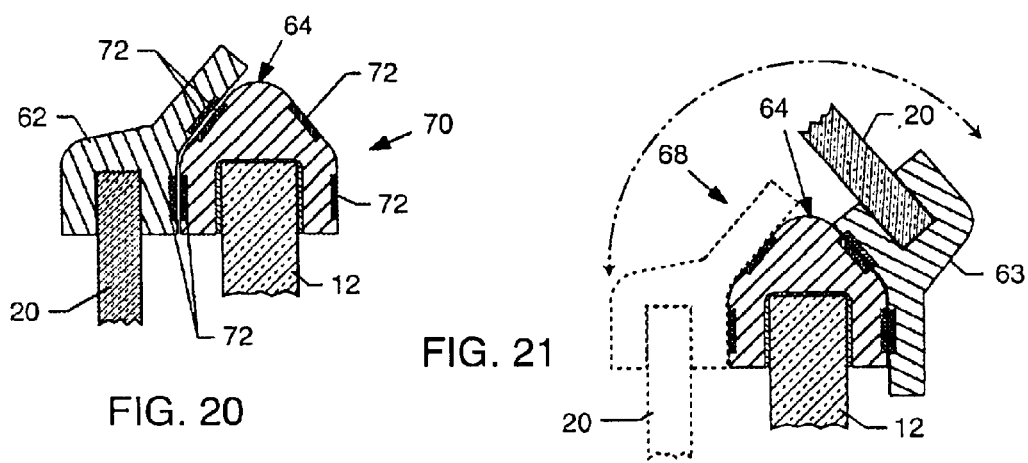
FIG. 20 is a partially fragmented cross-sectional view taken generally along line 20—20 of FIG. 18, illustrating the magnetic attachment of the auxiliary eyewear and the primary eyewear in an in-use position.
Figure 21:
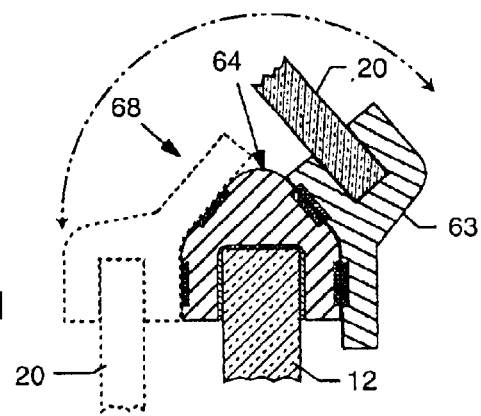
FIG. 21 is a partially fragmented and cross-sectional view taken generally along line 21—21 of FIG. 19, illustrating the auxiliary eyewear being pivoted away from the lenses of the primary eyewear by virtue of different magnetic attachment points.
Figure 22:
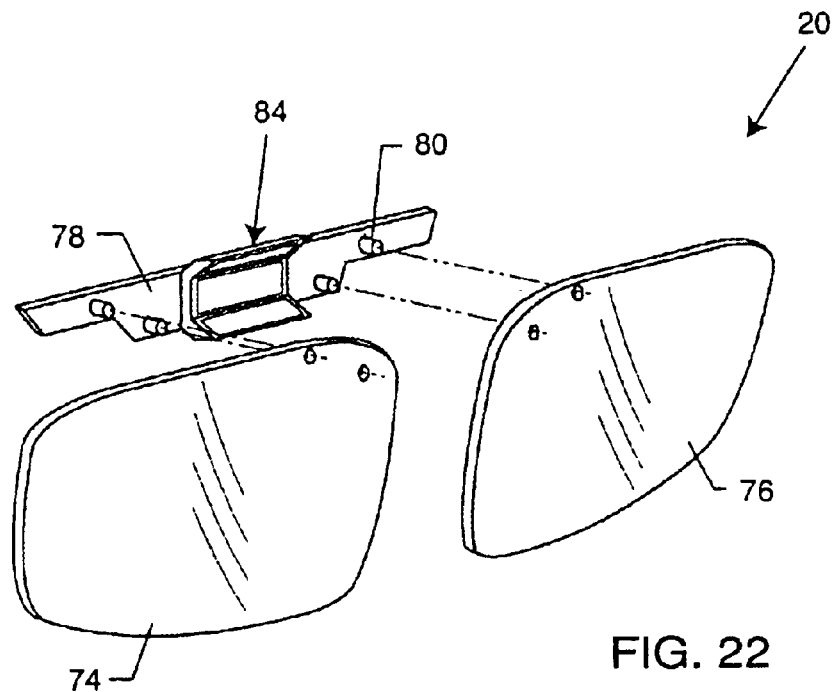
FIG. 22 is a rear perspective view of a hinge member mounted on a bracket and a pair of auxiliary lenses.

As shown in FIGS. 20 and 21, where the auxiliary eyewear 20 is desired to be in front of the lenses 14, the coupling 52 is magnetically attached to the front facet 68 of the saddles 64. The magnetic attraction between the coupling 62 and saddle 64 is such so as to hold the auxiliary eyewear 20 in place relative to the primary eyewear 10. The auxiliary eyewear or lense 20 can be moved out of alignment with the lenses 14 of the primary eyewear 10 by moving the coupling 62 from the front facet 68 to the rear facet 20, as illustrated in FIG. 21, such that the auxiliary eyewear lense 20 extends upwardly out of alignment with the lenses 14, yet not in contact with the forehead of the wearer of the eyeglasses 10. The angular offset of the faces of the front and rear facets 68 and 70 enable the auxiliary eyewear 20 to be positioned such. As the saddles 64 are removably attached to the frame 12 of the eyeglasses 10, they can be removed and inserted onto another pair of primary eyewear so that the auxiliary eyewear 20 can be attached to other eyewear as well.

With reference now to FIGS. 22–28, in yet another embodiment, a pair of auxiliary lenses 74 and 76 are interconnected with one another using a bracket 78 having a plurality of pins 80 which are inserted through apertures 82 so as to be frictionally engaged therewith, bonded in place with adhesive or the like, etc. A hinge member 84 is associated with the bracket 78, such as by fixing or otherwise attaching the hinge 84 to the bracket 78. It will be appreciated that the hinge member 84 can be attached to the auxiliary eyewear 20 by other means, such as a clip, direct bonding to the eyewear 20, etc.

Figure 23:
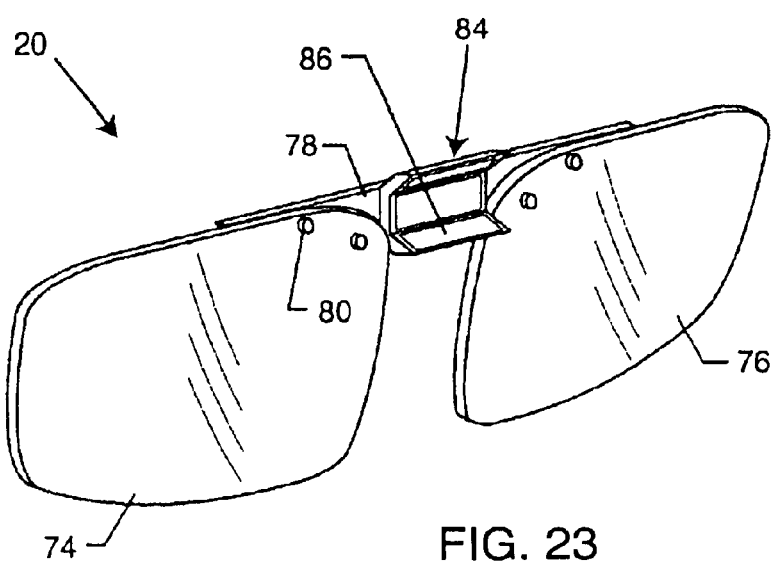
FIG. 23 is a rear perspective view of the auxiliary lenses attached to the hinge member assembly.

With reference to FIG. 23, the hinge member 84 has a plurality of generally planar inwardly-facing facets 86, in the embodiment illustrated a total of three which are angled from one another by 60°.

With reference now to FIG. 24, a primary eyewear, such as the illustrated eyeglasses 10 having a frame 12 and components 14–18 as discussed above, also has a hinge member 88 associated therewith. As illustrated in FIG. 24, the hinge member 88 is attached to a cross-beam 90 extending between frame members 12 of the two lenses 14 of the eyeglasses 10. The hinge member 88 is multi-faceted so as to have at least six generally planar outwardly-facing facets 92. In a particularly preferred embodiment, as illustrated, this hinge member 88 comprises a hexagon having six generally planar outwardly-facing facets. As illustrated in FIGS. 24 and 25, hinge members 84 and 88 compliment one another so as to be mated such that the inwardly facing facets 86 of the auxiliary hinge 84 are configured to overlie a plurality of the outwardly-facing facets 92 of the primary hinge 88, as illustrated in FIGS. 25–28.

The hinge members 84 and 88 are magnetically attracted to one another. That is, there is a magnetic field associated with at least some of the facets 86 or 92 such that the facets 86 and 92 are magnetically coupled to one another. This can be accomplished in a variety of ways. For example, the facets 86 or 92 could have magnets embedded therein, as described and discussed above in relation to FIGS. 18–21. That is, facets 86 or 92 could have magnets embedded therein which would attract and magnetically couple the opposite hinge member 84 or 88 which would be comprised of an appropriate material, such as an iron-based metal or the like. Magnets could be inserted in both of the facets 86 and 92 and disposed such that their opposite polarity faced outwardly so as to be attracted to one another. In yet another alternative, either the hinge member 84 or hinge member 88 would be comprised of a magnet or magnetized material such that it would magnetically attract and couple the opposite hinge member 84 or 88 thereto. However, in a particularly preferred embodiment, the facets 86 of hinge member 84 have a magnetic material or magnets 94 fixed on the planar facets 86 thereof. These magnets 94 create a magnetic field and attraction between the facets 86 and 92 of the hinge members 84 and 88 and couple the hinge members 84 and 88 to one another.

With reference now to FIGS. 26–28, due to the multi-faceted nature of the hinge members 84 and 88, and the fact that the number of inwardly-facing facets 86 of the auxiliary hinge member 84 is less than that of the outwardly-facing facets 92 of the primary hinge member 88, the hinge members 84 and 88 are capable of being selectively rotated in a segmented fashion. This is particularly illustrated in FIGS. 27 and 28 wherein the auxiliary hinge 84 coupled to the front three outwardly-facing facets 92 of hinge 88 can be moved in segmented fashion, in this case 60° with each segment, until a complete 180° of rotation is achieved, causing the auxiliary eyewear 20 to be pivoted upwardly and out of the field of vision of the primary eyewear 10. Of course, a complete 360° of rotation is also possible, in this case 60° with each segmented rotation. However, in the preferred implementation of this hinge system, the auxiliary eyewear 20 need only be rotated a total of 180° so as to be moved between an in-use position immediately in front of the eyeglass lenses 14 and a non-use position above the lenses 14 of the eyeglass 10.

It will be appreciated by those skilled in the art that the number of outwardly-facing facets 92 of the primary hinge 88 can be increased, for example, eight, ten, twelve, etc. Typically, the auxiliary hinge member 84 will have approximately half as many inwardly-facing facets 86 such that when the hinge members 84 and 88 are coupled to one another approximately 180° of the exterior surface of hinge member 88 is overlied by hinge member 84. This allows the auxiliary eyewear 20 to be placed at a pantoscopic angle with respect to the lenses 14 of the primary eyewear 10. Thus, if hinge member 88 were an octagon, hinge 84 would preferably include four generally planar inwardly-facing facets 86. In any event, there should be adequate magnetic coupling and contact between the hinge members 84 and 88 so that they are securely held with respect to one another yet capable of being rotated with respect to one another about the hinge axis of hinge member 88.

Figure 29:
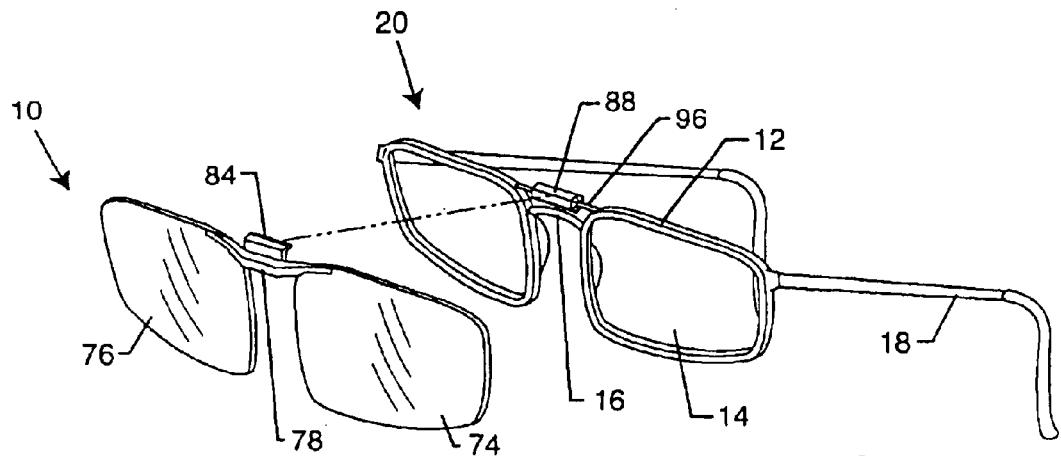
FIG. 29 is a partially exploded front perspective view of an auxiliary eyewear and a primary eyewear, each having magnetic hinge members.
Figure 30:
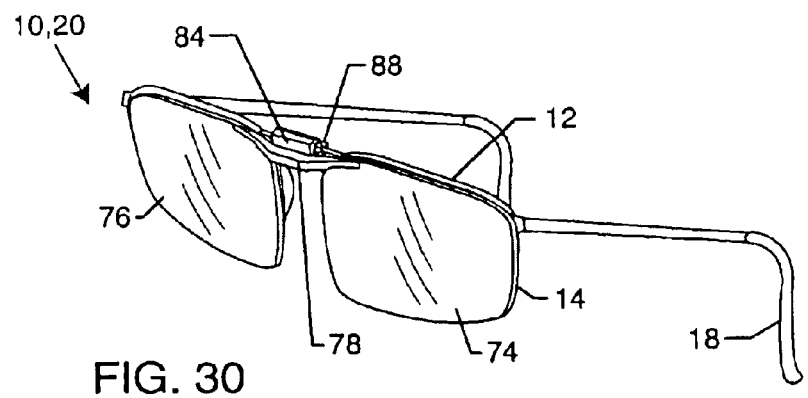
FIG. 30 is a front perspective view illustrating the auxiliary eyewear coupled to the primary eyewear by means of the hinge members.
Figure 31:
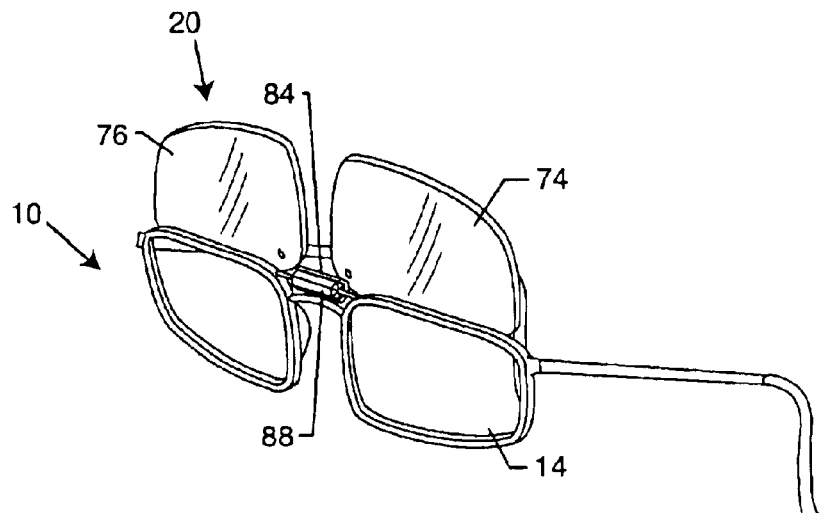
FIG. 31 is a front perspective view illustrating the auxiliary eyewear pivoted upwardly into a non-use position in accordance with the present invention.

Many eyeglass frames 12 do not include a cross-beam 90. In the event that they do, hinge 88 can be coupled directly thereto. In the event that they do not, cross-beam 90 can be attached to the frame 12, such as by bonding with adhesive, spot welding or any other adequate means. Cross-beam 90 and hinge member 88 could be constructed integrally with one another. With reference to FIGS. 29–31, eyeglass frame 12 can be constructed so as to include a cross-beam 96 extending above the nose bridge 16 and between the lenses 14 and have hinge member 88 attached thereto or formed integrally therewith. In this manner, the appropriate lense 14 could be inserted into the frame 12 of the eyewear and the auxiliary eyewear 20 removably and rotatably coupled thereto due to the magnetic coupling and connection between hinge members 84 and 88, as described above.

Figure 32:
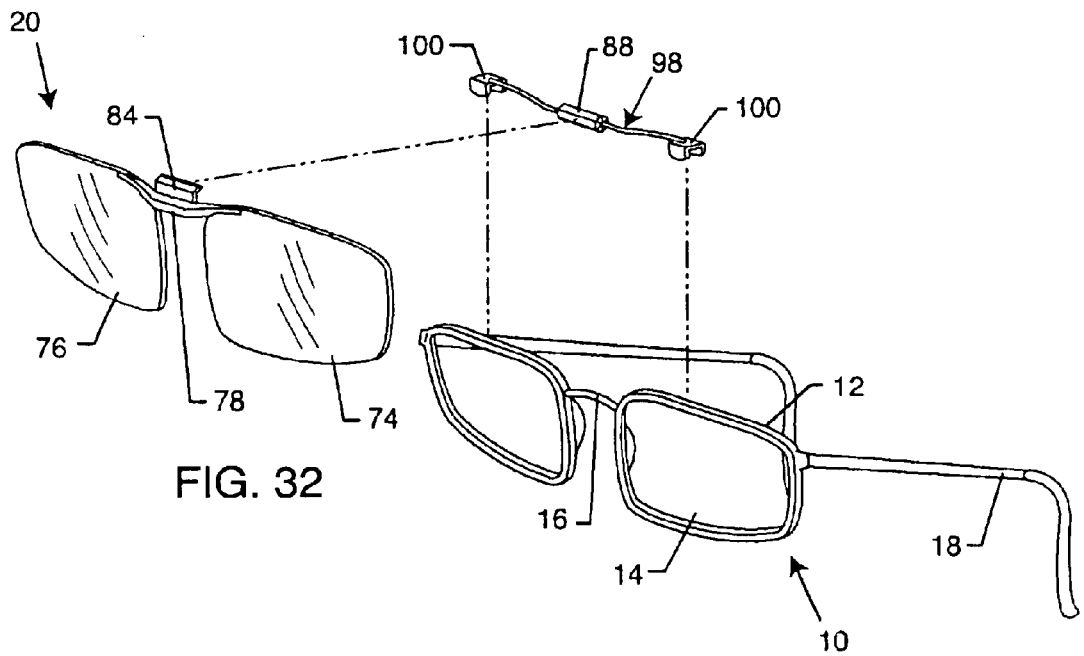
FIG. 32 is a partially exploded front perspective view of an auxiliary eyewear having a hinge member, a cross-bar having another hinge member and saddles for removable attachment to a frame of a primary eyewear.
Figure 33:
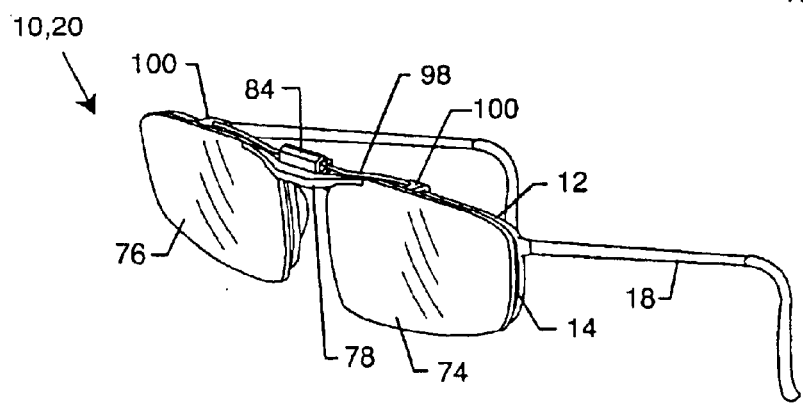
FIG. 33 is a front perspective view, illustrating the auxiliary eyewear magnetically coupled to the hinge member of the cross-bar attached to the primary eyewear, and in an in-use position.
Figure 34:
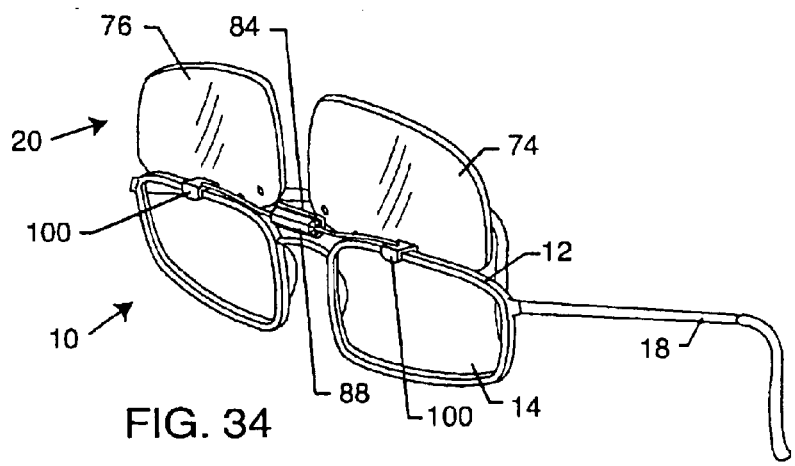
FIG. 34 is a front perspective view similar to FIG. 33, illustrating the auxiliary eyewear pivoted upwardly to a non-use position.

With reference now to FIGS. 32–34, a pair of eyeglasses 10 is illustrated having a frame 12 with no cross-bar. Many eyeglasses have this configuration and must be retrofit to accommodate the present invention. To accommodate existing eyewear 10, a removable cross-bar 98 is provided. The removable cross-bar 98 includes a hinge member 88, as described above, attached thereto or more typically integrally formed therewith. Saddles 100 are attached to or formed at the ends of the cross-bar 98 and adapted to be frictionally fit over portions of the eyeglass frame 12, as described above. As such, the saddles 100 are inverted U-shaped structures defining an open channel having a dimension sufficient to receive upper portions of the frame 12 on either side of the nose bridge 16 encircling a top portion of the lens 14, or in some cases the lens itself. Preferably, the saddles 100 include an elastomeric or the like material therein which serves to cushion against scratching and which can also serve to enhance the gripping between the saddle 100 and the frame 12. The interaction between hinges 84 of the auxiliary eyewear 20 and the hinge 88 of the cross-bar 98, attached to the primary eyewear 10, operates as discussed above.

Figure 35:
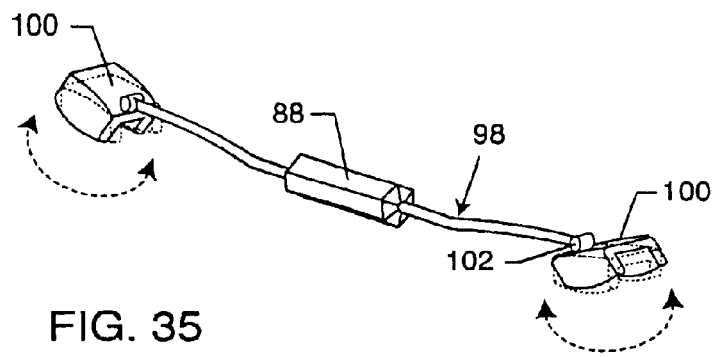
FIG. 35 is a perspective view of a cross-bar having a hinge member and articulating saddles, in accordance with the present invention.
Figure 36:
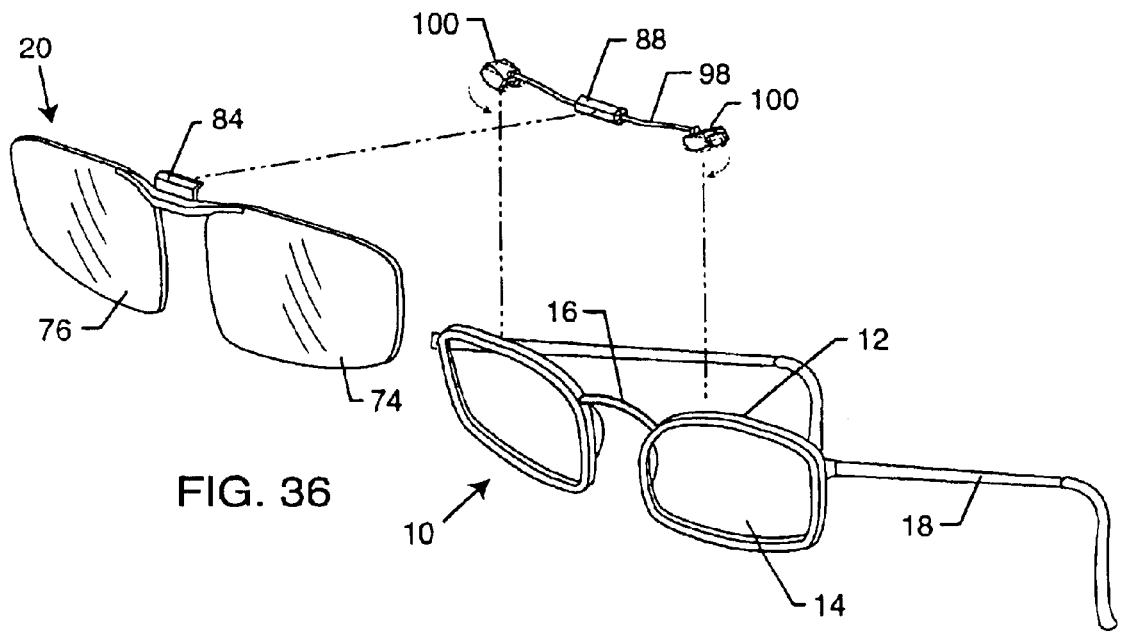
FIG. 36 is a partially exploded front perspective of an auxiliary eyewear having a hinge member, a cross-bar having another hinge member and articulated saddles, and a primary eyewear.
Figure 37:
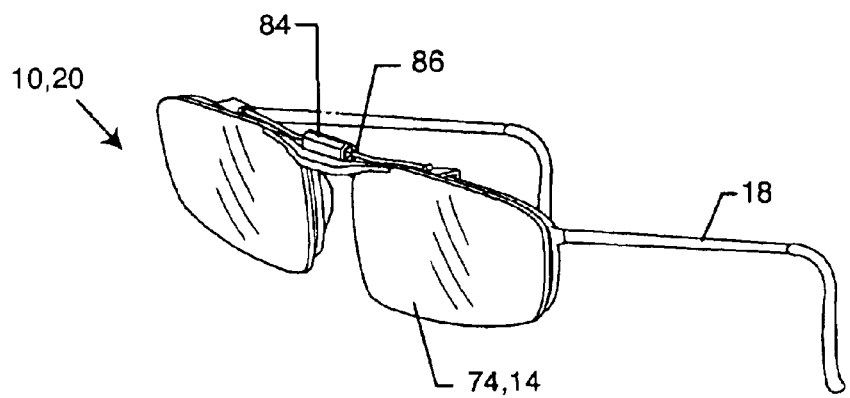
FIG. 37 is a perspective view of the attached primary eyewear, cross-bar, and auxiliary eyewear.

With reference now to FIGS. 35–37, in a particularly preferred embodiment, the saddles 100 are pivotally connected to the cross-bar 98, such as with a hinge 102 or other articulating structure. This enables the cross-bar 98 to be fitted to eyeglass frames of a different configuration, which may be more oval, circular, square, etc. depending upon the design of the eyeglasses 10. However, the distance between the lenses 14 is more or less consistent for an adult as the lenses 14 must be placed immediately in front of the user's eyes. The articulating or pivoting nature of the saddles 100 enables slight differences in distance or more particularly differences in shape of the frame 12 between the nose bridge 16 while using the same cross-beam 98.

Figure 38:
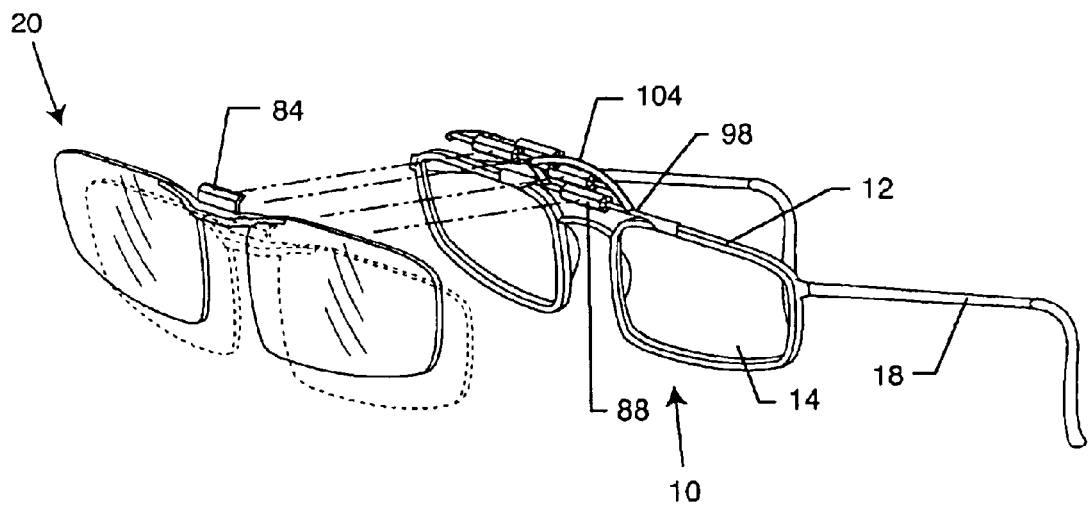
FIG. 38 is a partially exploded perspective view of a primary eyewear having an extension bearing multiple hinge members, and a first auxiliary eyewear and a second auxiliary eyewear, in phantom, exploded therefrom.
Figure 39:
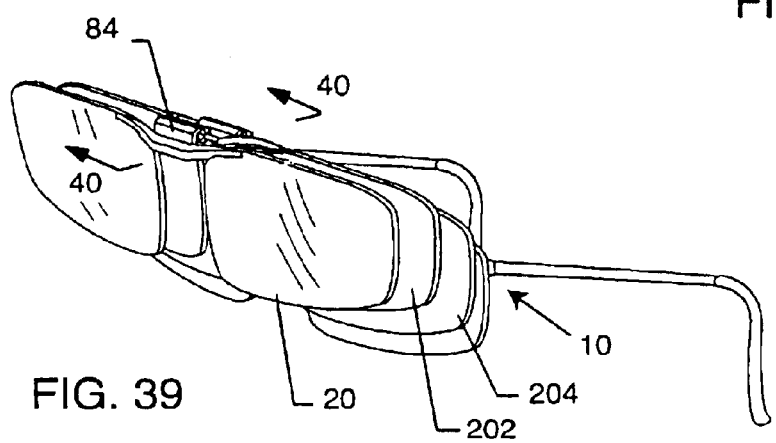
FIG. 39 is a front perspective view of a plurality of auxiliary eyewear detachably and rotatably connected to the primary eyewear by means of magnetic hinges in accordance with the present invention.
Figure 40:
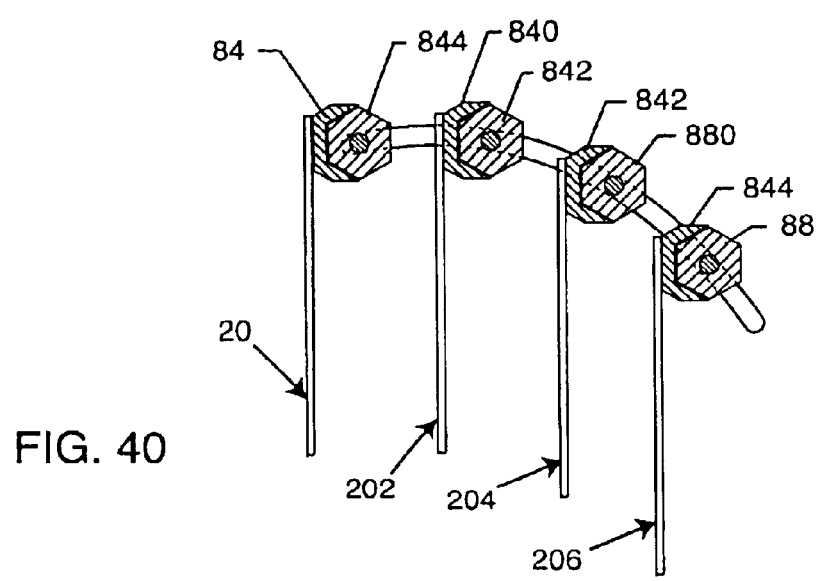
FIG. 40 is a cross-sectional view taken generally along line 40—40, illustrating the magnetic coupling of the hinge members of the primary eyewear and the multiple auxiliary eyewear.

With reference now to FIGS. 38–40, yet another embodiment is illustrated which is particularly adapted for use by jewelers, surgeons, etc. where it might be desirable to have a plurality of auxiliary eyewear 20, 202, 204, etc. For example, in the case of a surgeon, in a given moment the surgeon may need a particular magnification and at another moment may need to increase or decrease that magnification. The present invention fulfills this need by providing an extension bar 104 which extends from the cross-beam 90, 96 or 98 and which supports a plurality of hinge members 88, 880–884 thereon. As illustrated in FIGS. 38–40, the extension 104 may comprise angled or curved bars having rungs extending therebetween each supporting a hinge member 88, 880–884. Due to the angle and spacing of the hinge members 88, 880–884, multiple auxiliary eyewear 20, 202–206, can be removably associated with the primary eyewear 10. As illustrated in FIG. 40, the hinge member 84 of the auxiliary eyewear 20 would be coupled with a primary hinge member 88, as described and illustrated above. A second or even additional auxiliary eyewear 202–206 could be coupled to hinge members 880–884 in a similar manner as each has their own hinge member 840–844. The secondary eyewear 20, 202–206 would not only be detachably connected to the primary eyewear 10, but also capable of being segmentedly rotated out of view of the lens 14 of the primary eyewear 10 so as to increase or decrease magnification. Other uses are feasible as well, such as increased shading or opaqueness of the lenses of the auxiliary eyewear 20 for purposes of welding or the like.

Thus, those skilled in the art will appreciate the present invention provides a universal eyeglass attachment for a pre-existing pair of eyeglasses or other primary eyewear without having to alter the eyeglasses 10 in any manner. Additionally, the universal eyeglass attachment of the present invention enables auxiliary eyewear 20, such as sunshades, to be easily attached and removed from the primary eyewear 10. Moreover, due to the pivotal connection of the clip and auxiliary eyewear 20, the auxiliary eyewear 20 can be pivoted out of alignment with the lenses of the primary eye wearer so as not to be in the line of sight. Such movement allows not only sun shades to be moved in front of and away from eyeglasses to accommodate, for example, the entering into a dark room, but also other uses.

For example, the auxiliary eyewear 20 may comprise a prescription pair of lenses, which in conjunction with the lenses 14 of the primary eyewear 10 serve as bifocals or the like. The auxiliary eyewear lense or lenses 20 can be magnifying lenses for use of surgeons, dentists, jewelers, etc. Thus, the universal eyeglass attachment of the present invention can be used in a variety of settings and for a variety of different uses.

It will be appreciated that the magnetic hinge system, wherein hinge members 84 and 88 are magnetically coupled and selectively rotatable with respect to one another as described above, could be used not only in the preferred embodiments illustrated and described above, but also in uses other than eyewear. Indeed, it will be appreciated by those skilled in the art, that the magnetic hinge system could be advantageously incorporated whenever two objects must be detachably and rotatably coupled to one another. Thus, the invention should not necessarily be restricted to the universal eye attachment embodiments illustrated and discussed above.

Although several embodiments have been described in detail for purposes of illustration, various modifications may be made without departing from the scope and spirit of the invention. Accordingly, the invention is not to be limited, except as by the appended claims.

What is claimed is:

1. A magnetic hinge system for rotatably coupling a first object to a second object, comprising:
    a first hinge member associated with the first object and defining a hinge axis, the first hinge member having at least six generally planar outwardly-facing facets disposed about the hinge axis;
    a second hinge member associated with the second object and having a plurality of generally planar inwardly-facing facets configured to overlie less than all of the outwardly-facing facets; and
    a magnetic field associated with at least some of the facets to couple the second hinge member to the first hinge member and permit selective segmented rotation of the second hinge member relative to the first hinge member about the hinge axis.

2. The system of claim 1, wherein the second hinge member includes at least half as many facets as the first hinge member.

3. The system of claim 2, wherein approximately 180 degrees of the exterior surface of the first hinge member is overlied by the second hinge member.

4. The system of claim 3, wherein the first hinge member comprises a hexagon and the second hinge member includes three facets overlying three outwardly-facing facets of the hexagon simultaneously.

5. The system of claim 1, wherein at least a plurality of the facets of the first hinge member have magnets embedded therein for magnetic coupling with the facets of the second hinge member.

6. The system of claim 1, wherein at least a plurality of the facets of the second hinge member have magnets embedded therein for magnetic coupling with the facets of the first hinge member.

7. The system of claim 1, wherein at least a plurality of the facets of the first and second hinge members have magnets embedded therein such that the magnets of the first and second hinge members couple with one another as the facets thereof are placed into contact with one another.

8. The system of claim 1, wherein the first hinge member is magnetic.

9. The system of claim 1, wherein the second hinge member is magnetic.

10. The system of claim 1, wherein the first object comprises a primary eyewear, and the second object comprises an auxiliary eyewear detachably and rotatably connected to the primary eyewear.

11. The system of claim 1, wherein the first object comprises a cross-bar having saddles configured to be removably attached to a primary eyewear.

12. The system of claim 11, wherein the saddles are frictionally engageable with the primary eyewear.

13. The system of claim 11, including a gripping material disposed on an inner surface of the saddles for frictionally engaging the frame of the primary eyewear.

14. The system of claim 11, wherein the saddles are pivotally attached to the cross-bar.

15. The system of claim 11, wherein the second object comprises an auxiliary eyewear.

16. The system of claim 15, wherein the cross-bar includes an extension supporting a plurality of first hinges spaced apart from one another such that a plurality of auxiliary eyewear can be pivotally mounted to the primary eyewear.

17. A magnetic hinge system for rotatably and removably coupling an auxiliary eyewear to a primary eyewear, comprising:
   a cross-bar connected to a frame of the primary eyewear;
   a first hinge member associated with the cross-bar and defining a hinge axis, the first hinge member having at least six generally planar outwardly-facing facets disposed about the hinge axis;
   a second hinge member associated with the auxiliary eyewear and having a plurality of generally planar inwardly-facing facets configured to overlie less than all of the outwardly-facing facets of the first hinge member; and
   a magnetic field associated with at least some of the facets to couple the second hinge member to the first hinge member and permit selective segmented rotation of the second hinge member relative to the first hinge member about the hinge axis.

18. The system of claim 17, wherein the second hinge member includes at least half as many facets as the first hinge member so as to overlie approximately 180 degrees of the exterior surface of the first hinge member.

19. The system of claim 17, wherein the first hinge member comprises a hexagon and the second hinge member includes three facets simultaneously overlying three outwardly-facing facets of the hexagon.

20. The system of claim 17, wherein the first hinge member is magnetic.

21. The system of claim 20, wherein at least a plurality of the facets of the first hinge member have magnets embedded therein for magnetic coupling with the facets of the second hinge member.

22. The system of claim 17, wherein the second hinge member is magnetic.

23. The system of claim 22, wherein at least a plurality of the facets of the second hinge member have magnets embedded therein for magnetic coupling with the facets of the first hinge member.

24. The system of claim 17, including saddles attached to the cross-bar for removably and frictionally attaching the cross-bar to the primary eyewear.

25. The system of claim 24, including a gripping material disposed on an inner surface of the saddles for frictionally engaging the frame of the primary eyewear.

26. The system of claim 24, wherein the saddles are pivotally attached to the cross-bar.

27. The system of claim 17, wherein the cross-bar includes an extension supporting a plurality of first hinges spaced apart from one another such that a plurality of auxiliary eyewear can be pivotally mounted to the primary eyewear.

* * * * *